United States Patent
Shibata et al.

(10) Patent No.: US 11,938,980 B2
(45) Date of Patent: Mar. 26, 2024

(54) SIGNAL CONTROL DEVICE AND ABNORMALITY DETECTION METHOD

(71) Applicant: Mitsubishi Electric Corporation, Tokyo (JP)

(72) Inventors: Ken Shibata, Tokyo (JP); Tetsuo Komura, Tokyo (JP); Hiromi Goda, Tokyo (JP); Hiroshi Jota, Tokyo (JP); Kentaro Hoshino, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 933 days.

(21) Appl. No.: 16/960,195

(22) PCT Filed: Jan. 16, 2018

(86) PCT No.: PCT/JP2018/001064
§ 371 (c)(1),
(2) Date: Jul. 6, 2020

(87) PCT Pub. No.: WO2019/142245
PCT Pub. Date: Jul. 25, 2019

(65) Prior Publication Data
US 2021/0061325 A1    Mar. 4, 2021

(51) Int. Cl.
*B61L 15/00* (2006.01)
*G06F 3/14* (2006.01)

(52) U.S. Cl.
CPC ....... *B61L 15/0081* (2013.01); *B61L 15/0063* (2013.01); *B61L 15/0072* (2013.01); *B61L 15/009* (2013.01); *G06F 3/14* (2013.01)

(58) Field of Classification Search
CPC ............ B61L 15/0081; B61L 15/0063; B61L 15/0072; B61L 15/009; G06F 3/14; B60L 3/0084; B60L 3/12; B60L 3/00
(Continued)

(56) References Cited

U.S. PATENT DOCUMENTS

| 4,348,653 A * | 9/1982 | Tsuzuki ................. G10L 19/00 340/460 |
| 8,996,233 B2 * | 3/2015 | Waku ................. F16H 61/0031 701/99 |

(Continued)

FOREIGN PATENT DOCUMENTS

| CN | 112339796 A * | 2/2021 | .......... B16L 15/0081 |
| JP | 2000255431 A | 9/2000 | |

(Continued)

OTHER PUBLICATIONS

Office Action dated Nov. 19, 2020, for corresponding Indian patent Application No. IN 202027028748, 6 pages.

(Continued)

*Primary Examiner* — B M M Hannan
(74) *Attorney, Agent, or Firm* — BUCHANAN INGERSOLL & ROONEY PC

(57) ABSTRACT

A RIO device mounted to a train includes an output unit that outputs a signal to a relay mounted to the train, and a controller that controls whether or not to cause the output unit to output the signal. The output unit includes a readback circuit that detects whether or not the signal is outputted from the output unit. The controller makes a signal stop request and a signal output request to the output unit before operation of the train starts, acquires a detection result of the readback circuit while each of the signal stop request and the signal output request is performed, and detects abnormality of the output unit using the detection result.

20 Claims, 12 Drawing Sheets

(58) Field of Classification Search
USPC .......................................................... 701/29.2
See application file for complete search history.

(56) References Cited

U.S. PATENT DOCUMENTS

| | | | | |
|---|---|---|---|---|
| 9,002,573 | B2* | 4/2015 | Kawamura | G07C 5/0808 |
| | | | | 701/29.2 |
| 9,031,740 | B2* | 5/2015 | Kuramochi | H04L 12/40026 |
| | | | | 701/29.2 |
| 9,135,803 | B1* | 9/2015 | Fields | G08B 21/02 |
| 2003/0158638 | A1* | 8/2003 | Yakes | G07C 5/008 |
| | | | | 180/65.245 |
| 2004/0002794 | A1* | 1/2004 | Pillar | B65F 3/045 |
| | | | | 701/1 |
| 2007/0299587 | A1* | 12/2007 | Breed | G07C 5/085 |
| | | | | 701/29.2 |
| 2010/0268408 | A1* | 10/2010 | Yuki | B60L 3/04 |
| | | | | 180/65.21 |
| 2011/0302078 | A1* | 12/2011 | Failing | B60L 53/126 |
| | | | | 700/297 |
| 2014/0060979 | A1* | 3/2014 | Martin | B60T 17/228 |
| | | | | 188/1.11 E |
| 2016/0039291 | A1* | 2/2016 | Reese | G07C 5/0841 |
| | | | | 701/29.3 |
| 2016/0207552 | A1* | 7/2016 | Mian | B61L 15/0072 |
| 2016/0347196 | A1* | 12/2016 | Nakamura | B60L 3/0038 |
| 2016/0347326 | A1* | 12/2016 | Iwagami | B60W 10/06 |
| 2017/0101115 | A1* | 4/2017 | Swenson | B61L 27/57 |
| 2017/0151965 | A1* | 6/2017 | Brooks | B61L 15/0081 |
| 2017/0225636 | A1* | 8/2017 | Tanigawa | B60L 1/00 |
| 2017/0297432 | A1* | 10/2017 | Ogawa | B60L 3/0023 |
| 2018/0312180 | A1* | 11/2018 | Wang | B61L 15/009 |
| 2018/0322791 | A1* | 11/2018 | Brooks | B61L 15/0072 |
| 2020/0079343 | A1* | 3/2020 | Martin | B60T 13/66 |
| 2020/0086900 | A1* | 3/2020 | de Albuquerque Gleizer | B61L 27/16 |

FOREIGN PATENT DOCUMENTS

| | | | | |
|---|---|---|---|---|
| JP | 2004364411 A | | 12/2004 | |
| JP | 4145740 B2 | | 9/2008 | |
| JP | 2009069864 A | * | 4/2009 | .......... G05B 19/054 |
| JP | 2010195209 A | | 9/2010 | |
| JP | 2014072569 A | | 4/2014 | |
| JP | 2014083902 A | * | 5/2014 | |
| JP | 2017099130 A | * | 6/2017 | |
| KR | 20020088090 A | * | 11/2002 | |
| KR | 101194166 B1 | * | 7/2012 | |
| WO | WO-2016072002 A1 | * | 5/2016 | ............ B60L 3/0046 |
| WO | WO-2022088862 A1 | * | 5/2022 | ............ B16L 15/0081 |

OTHER PUBLICATIONS

International Search Report (PCT/ISA/210), with translation, and Written Opinion (PCT/ISA/237) dated Apr. 24, 2018, by the Japan Patent Office as the International Searching Authority for International Application No. PCT/JP2018/001064.

Notice of Rejection dated Jul. 21, 2020, issued in Japanese Patent Application No. 2019-566017, 7 pages including 4 pages of English translation.

* cited by examiner

SIGNAL CONTROL DEVICE AND ABNORMALITY DETECTION METHOD

FIELD

The present invention relates to a signal control device that is mounted to a train and also relates to an abnormality detection method.

BACKGROUND

If a signal control device which performs control by outputting a signal to a vehicle system fails and some unintentional signal is outputted from the failure signal control device to the vehicle system during operation of a train, there is a possibility that the vehicle system malfunctions. Therefore, detection of abnormality of the signal control device is desirable in order to prevent the vehicle system from malfunctioning. According to a technique disclosed in Patent Literature 1, a railroad safety control device includes a plurality of control systems that control devices of a vehicle system by outputting a signal to the vehicle system. Each of the control system performs mutual collation of data sets that are inputted and outputted between the control system and the devices of the vehicle system to determine whether there is a failure in the control system or not. When the failure in the control system is detected, operation of a train is brought to a stop.

CITATION LIST

Patent Literature

Patent Literature 1: Japanese Patent Application Laid-open No. 2000-255431

SUMMARY

Technical Problem

However, according to the above conventional technique, the train that is in the process of operation needs to be stopped. Therefore, a lot of time and effort are problematically required to restore operation control of the train to a normal state. In addition, because of the configuration including two or more control systems, the device gets problematically larger.

The present invention has been made in view of the above circumstances, and an object of the present invention is to obtain a signal control device that can detect abnormality before operation of a train is performed, with a simple configuration.

Solution to Problem

In order to solve the above-stated problems and achieve the object, the present invention provides a signal control device mounted to a train, the signal control device comprising: an output unit to output a signal to an external device mounted to the train; and a controller to control whether or not to cause the output unit to output the signal, wherein the output unit includes a readback circuit to detect whether or not the signal is outputted from the output unit, and the controller makes a signal stop request and a signal output request to the output unit before operation of the train starts, acquires a detection result of the readback circuit while each of the signal stop request and the signal output request is performed, and detects abnormality of the output unit using the detection result.

Advantageous Effects of Invention

A signal control device according to the present invention can detect abnormality before operation of a train is performed, with a simple configuration.

DESCRIPTION OF EMBODIMENTS

With reference to the drawings, a detailed description is hereinafter provided of signal control devices and abnormality detection methods according to embodiments of the present invention. It is to be noted that these embodiments do not necessarily limit the present invention.

First Embodiment

Figure 1:
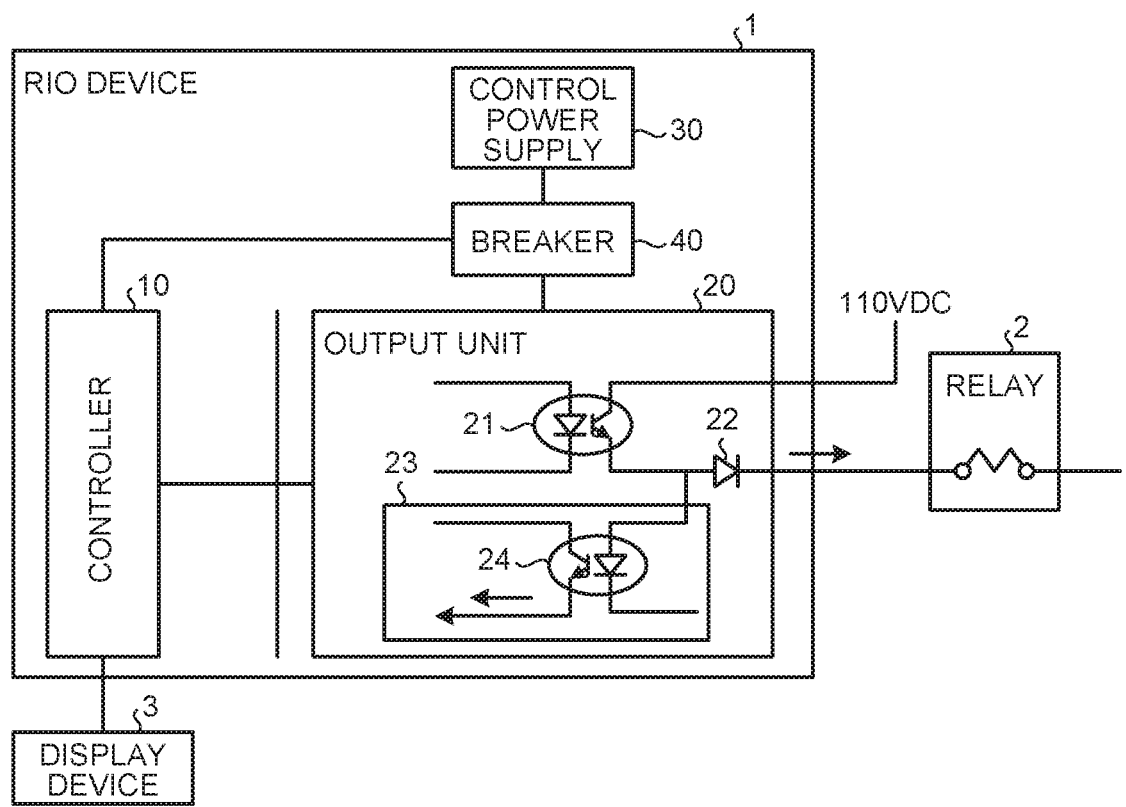
FIG. 1 is a block diagram illustrating a configuration example of a RIO (Remote Input Output) device according to a first embodiment.

In the present embodiment, one example of a signal control device is a RIO device. A description is hereinafter provided of an example in which the RIO device is mounted to a train that is not illustrated. FIG. 1 is a block diagram illustrating a configuration example of the RIO device 1 according to the first embodiment of the present invention. The RIO device 1 is connected to a relay 2 and a display device 3. The RIO device 1 outputs, to the relay 2, a digital output (DO) signal, that is, a 110 V direct current signal in this example. The 110 V direct current signal that is outputted as the DO signal from the RIO device 1 is given as one example, and a DO signal is not limited to a 110 V direct current signal. The relay 2 is an external device whose operation is controlled by the RIO device 1 and is here an onboard device mounted to the train. The relay 2 is one example of an onboard device, and an onboard device connected to the RIO device 1 is not limited to the relay 2. When the RIO device 1 has detected its abnormality, the display device 3 displays, under control of the RIO device 1, that the RIO device 1 has the abnormality. The display device 3 is, for example, a monitor installed in a train cab that is not illustrated.

A description is provided of the configuration of the RIO device 1. The RIO device 1 includes a controller 10, an output unit 20, a control power supply 30, and a breaker 40. The controller 10 controls whether or not to cause the output unit 20 to output the DO signal. Under control of the controller 10, the output unit 20 outputs the DO signal to the relay 2 mounted to the train. The control power supply 30 supplies power to the output unit 20. Under control of the controller 10, the breaker 40 controls the supply of power from the control power supply 30 to the output unit 20.

A description is provided of a configuration of the output unit 20. The output unit 20 includes a photocoupler 21, a diode 22, and a readback circuit 23. The photocoupler 21 outputs the DO signal when the controller 10 has made a signal output request and does not output the DO signal when the controller 10 has made a signal stop request. The diode 22 prevents backflow of a signal from a side of the relay 2. The readback circuit 23 includes a photocoupler 24. The photocoupler 24 is connected to a connecting point between the photocoupler 21 and the diode 22 and detects that the DO signal has been outputted from the photocoupler 21. In other words, the photocoupler 24 detects an output state of the DO signal from the photocoupler 21. This output state is either a state of the DO signal being outputted from the photocoupler 21 or a state of no DO signal being outputted from the photocoupler 21. The readback circuit 23 outputs, to the controller 10, a detection result indicative of the output state of the DO signal. Using the detection result obtained from the readback circuit 23, the controller 10 detects the abnormality of the output unit 20. The abnormality of the output unit 20 corresponds, for example, to failure of the output unit 20.

Figure 2:
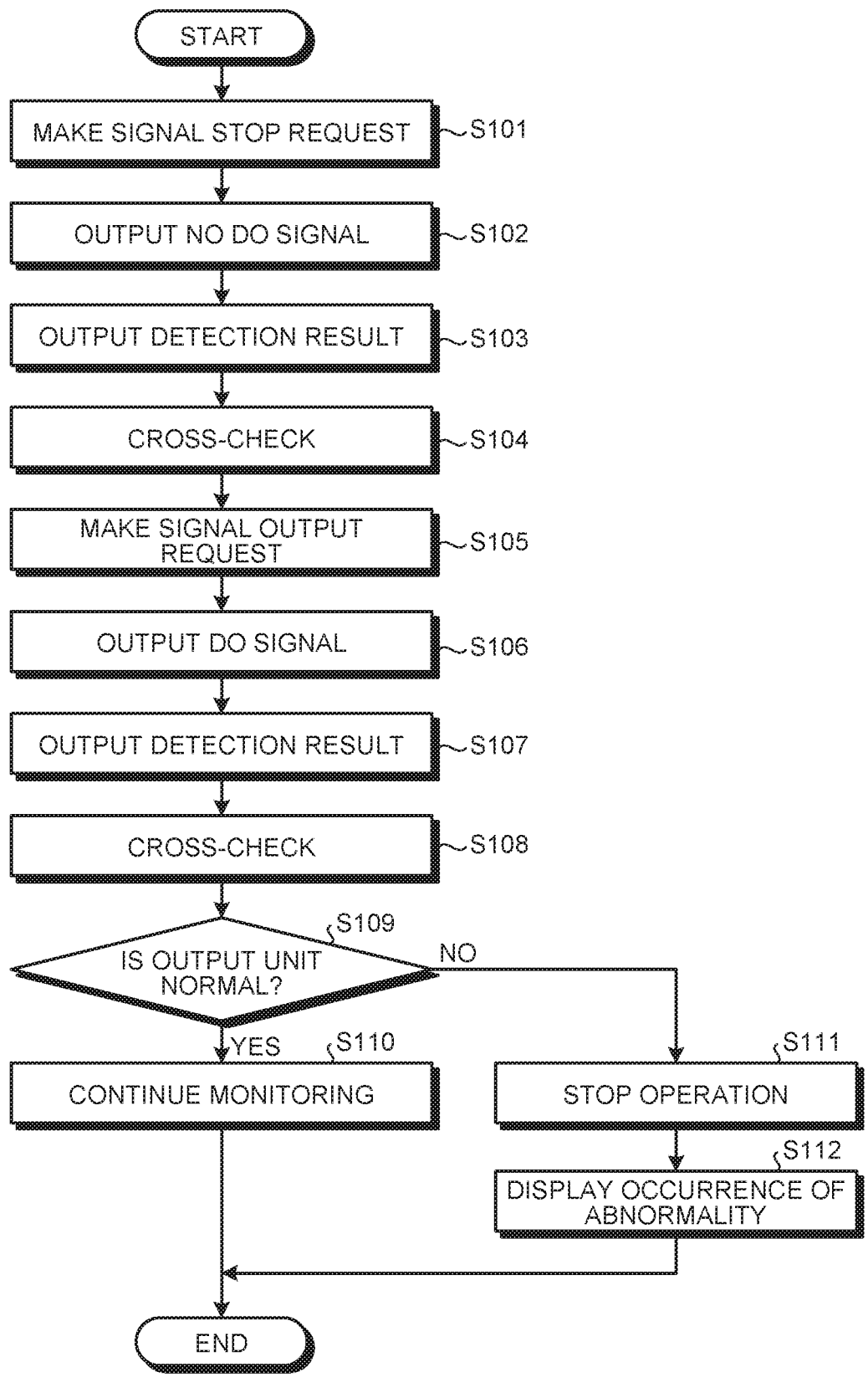
FIG. 2 is a flowchart illustrating an abnormality detection process of the RIO device according to the first embodiment.
Figure 3:
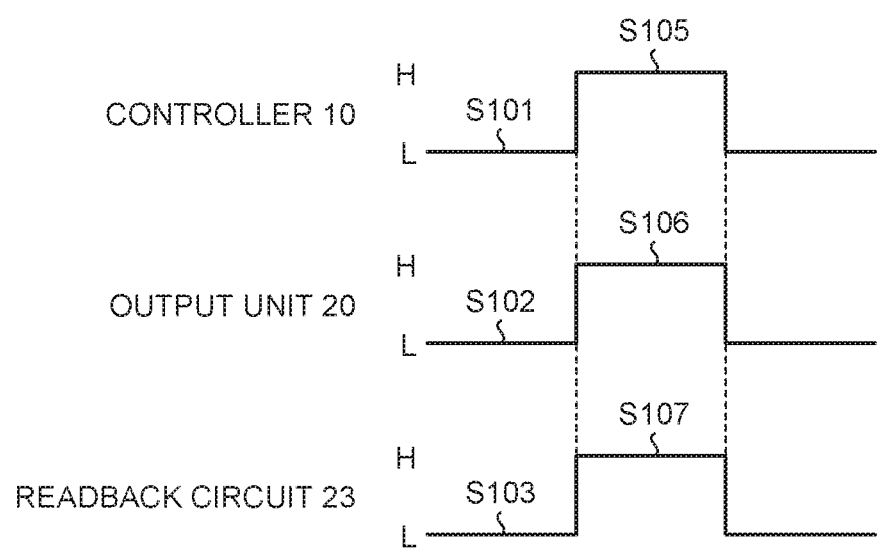
FIG. 3 illustrates signal output states of constituent elements of the RIO device according to the first embodiment.

A description is provided next of an abnormality detection process of the RIO device 1. FIG. 2 is a flowchart illustrating the abnormality detection process of the RIO device 1 according to the first embodiment. FIG. 3 illustrates signal output states of the constituent elements of the RIO device 1 according to the first embodiment. Illustrated in a top row of FIG. 3 is a signal outputted from the controller 10. A middle row of FIG. 3 illustrates whether or not the DO signal is outputted from the output unit 20. Illustrated in a bottom row of FIG. 3 is a detection result of the readback circuit 23, that is, a signal outputted from the readback circuit 23. Characters indicated in FIG. 3 including S101 and so on are characters indicative of steps in the flowchart of FIG. 2. As illustrated in the top row of FIG. 3, the signal outputted from the controller 10 takes on either one of values that represent two levels including a low (L) level and a high (H) level. The low (L) level indicates the signal stop request to the output unit 20, while the high (H) level indicates the signal output request to the output unit 20. The signal stop request is an instruction issued by the controller 10 to request the output unit 20 not to output the DO signal. The signal output request is an instruction issued by the controller 10 to request the output unit 20 to output the DO signal. As illustrated in the middle row of FIG. 3, depending on whether or not the DO signal is outputted from the output unit 20, either one of values representing two levels including a low (L) level and a high (H) level is taken. The low (L) level indicates the state of no DO signal being outputted, while the high (H) level indicates the state of the DO signal being outputted. As illustrated in the bottom row of FIG. 3, the detection result of the readback circuit 23 takes on either one of values that represent two levels including a low (L) level and a high (H) level. The low (L) level indicates no DO signal being outputted from the output unit 20, while the high (H) level indicates the DO signal being outputted from the output unit 20. It is to be noted that the above settings for the low (L) level and the high (H) level indicating an output state of each signal is one example and some settings reverse of the example shown in FIG. 3 may be realized. The same applies to those embodiments that follow.

When the RIO device 1 is activated, the controller 10 makes the signal stop request to the output unit 20 before operation of the train mounted with the RIO device 1 starts (step S101). While the signal stop request is made from the controller 10, the output unit 20 does not output the DO signal from the photocoupler 21 (step S102). Moreover, the readback circuit 23 of the output unit 20 outputs to the controller 10 the detection result indicative of no DO signal being outputted from the output unit 20 (step S103).

The controller 10 obtains from the readback circuit 23 the detection result obtained during the signal stop request being made as the instruction and cross-checks the obtained detection result against the request made to the output unit 20 (step S104). In the example of FIG. 3, since the detection result (step S103) indicating no DO signal being outputted from the output unit 20 is obtained in response to the signal stop request (step S101), the controller 10 determines that the output unit 20 is normal.

Next, the controller 10 makes the signal output request to the output unit 20 (step S105). During the signal output request being made as the instruction by the controller 10, the output unit 20 outputs the DO signal from the photocoupler 21 (step S106). Moreover, the readback circuit 23 of the output unit 20 outputs to the controller 10 the detection result indicative of the DO signal being outputted from the output unit 20 (step S107).

The controller 10 obtains from the readback circuit 23 the detection result obtained during the signal output request being made as the instruction and cross-checks the obtained detection result against the request made to the output unit 20 (step S108). In the example of FIG. 3, since the detection result (step S107) indicating the DO signal being outputted from the output unit 20 is obtained in response to the signal output request (step S105), the controller 10 determines that the output unit 20 is normal. It is to be noted that the orders of the processes of step S101 to step S104 and the processes of step S105 to step S108 may be exchanged. If there is enough time before the operation of the train mounted with the RIO device 1 starts, the RIO device 1 may execute the processes of step S101 to step S108 multiple times in order to improve abnormality detection accuracy.

If the controller 10 determines at both step S104 and step S108 that the output unit 20 is normal (step S109: Yes), the controller 10 continues monitoring an operating state of the output unit 20 through continual acquisition of the detection result from the readback circuit 23 after the start of the operation of the train (step S110). The continued monitoring of the operating state of the output unit 20 means that the controller 10 checks whether or not the DO signal is actually outputted on the basis of the detection result obtained from the readback circuit 23 in response to the signal output request or the signal stop request for the DO signal, which are made to the output unit 20 in association with the actual operation of the train.

If the controller 10 determines at either or both of steps S104 and S108 that the output unit 20 is abnormal (step S109: No), the controller 10 controls the breaker 40 to stop the supply of power from the control power supply 30 to the output unit 20, thus stopping operation of the output unit 20 (step S111). Specific abnormal cases of the output unit 20 include a case where the detection result of the readback circuit 23 is high (H) when the signal from the controller 10 is low (L) at step S104 and a case where the detection result of the readback circuit 23 is low (L) when the signal from the controller 10 is high (H) at step S108. If, for example, there is unintended output of the DO signal from the output unit 20 due to the abnormality of the output unit 20, it is expected to be incapable of stopping output of the DO signal even through the controller 10 tries to control the output unit 20. Therefore, the controller 10 stops the supply of power from the control power supply 30 to the output unit 20, thereby forcing the operation of the output unit 20 to be stopped. In this way, the controller 10 can prevent the train mounted with the RIO device 1 from malfunctioning when the unintended DO signal is outputted from the output unit 20.

The controller 10 causes the display device 3 to display that the output unit 20 or the RIO device 1 has the abnormality (step S112). By so doing, a user who is, for example, a motorman can be aware of the abnormality of the RIO device 1 when checking contents provided by the display device 3.

As described above, when the output unit 20 has the abnormality, the RIO device 1 can detect the abnormality of the output unit 20 at an early stage by checking the operating state of the output unit 20 before the start of the operation of the train.

A description is provided next of a hardware configuration of the RIO device 1. The output unit 20 of the RIO device 1 is a digital signal output circuit. The control power supply 30 is a direct current power supply that supplies, for example, a 5 V direct current power to the output unit 20. The breaker 40 is a switch configured to control the supply of power from the control power supply 30 to the output unit 20 under the control of the controller 10. The controller 10 is implemented by a processing circuit. In other words, the RIO device 1 is equipped with a processing circuit that is capable of detecting the abnormality of the output unit 20 at the early stage. The processing circuit may be a memory and a processor that executes a program stored in the memory or may be of dedicated hardware.

Figure 4:
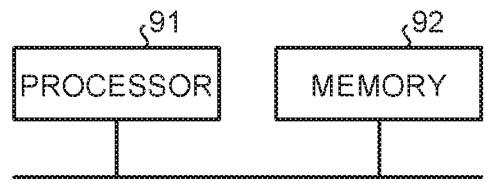
FIG. 4 illustrates an example in which a processing circuit of the RIO device according to the first embodiment is configured to include a processor and a memory.

FIG. 4 illustrates an example in which the processing circuit owned by the RIO device 1 according to the first embodiment is configured by using a processor and a memory. When the processing circuit is configured using the processor 91 and the memory 92, functions of the processing circuit of the RIO device 1 is implemented by software, firmware, or a combination of software and firmware. The software or the firmware is described as a program and stored in the memory 92. In the processing circuit, the processor 91 reads and executes the programs stored in the memory 92 thereby implementing the functions. This means that the processing circuit has the memory 92 for storing the programs by which early detection of the abnormality of the output unit 20 is realized. In addition, these programs can be said to cause a computer to execute the steps and the method of the RIO device 1.

The processor 91 may here be, for example, a central processing unit (CPU), a processing device, an arithmetic device, a microprocessor, a microcomputer, or a digital signal processor (DSP). The memory 92 corresponds to: for example, a nonvolatile or volatile semiconductor memory such as a random-access memory (RAM), a read-only memory (ROM), a flash memory, an erasable programmable ROM (EPROM), or an electrically EPROM (EEPROM) (registered trademark); a magnetic disk; a flexible disk; an optical disk; a compact disk; a mini disk; or a digital versatile disc (DVD).

Figure 5:
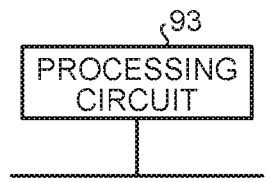
FIG. 5 illustrates an example in which the processing circuit of the RIO device according to the first embodiment is configured as a dedicated hardware set.

FIG. 5 illustrates an example in which the processing circuit owned by the RIO device 1 according to the first embodiment is configured by dedicated hardware. When the processing circuit is configured by the dedicated hardware, a processing circuit 93 illustrated in FIG. 5 corresponds to, for example, a single circuit, a composite circuit, a programmed processor, a parallel programmed processor, an application specific integrated circuit (ASIC), a field-programmable gate array (FPGA), or any combination of them. Each of the functions of the RIO device 1 may be implemented by the processing circuit 93 or all the functions may be implemented by the processing circuit 93.

It is to be noted that some of the functions of the RIO device 1 may be implemented by dedicated hardware, while the rest of the functions may be implemented by software or firmware. As mentioned above, the processing circuit can realize the above-described functions using dedicated hardware, software, firmware or any combination of them.

According to the present embodiment described above, after the RIO device 1 is activated, the RIO device 1 makes the signal stop request and the signal output request to the output unit 20 before the start of the operation of the train. Then, the RIO device 1 acquires a detection result indicative of the output state of the DO signal from the output unit 20 from the readback circuit 23 of the output unit 20. Further, the RIO device 1 determines the operating state of the output unit 20 on the basis of the request made to the output unit 20 and the detection result. Before the operation of the train starts, the RIO device 1 voluntarily makes the signal stop request and the signal output request that are not related to the operation of the train, requests being made to detect the abnormality of the output unit 20. By doing so, when the output unit 20 has the abnormality, the RIO device 1 can detect the abnormality of the output unit 20 before the operation of the train. Moreover, the RIO device 1 can detect the abnormality of the output unit 20 with a simple configuration without two or more control systems.

Second Embodiment

A RIO device according to the second embodiment is configured to include an input unit. A description is provided of a part different from the first embodiment.

Figure 6:
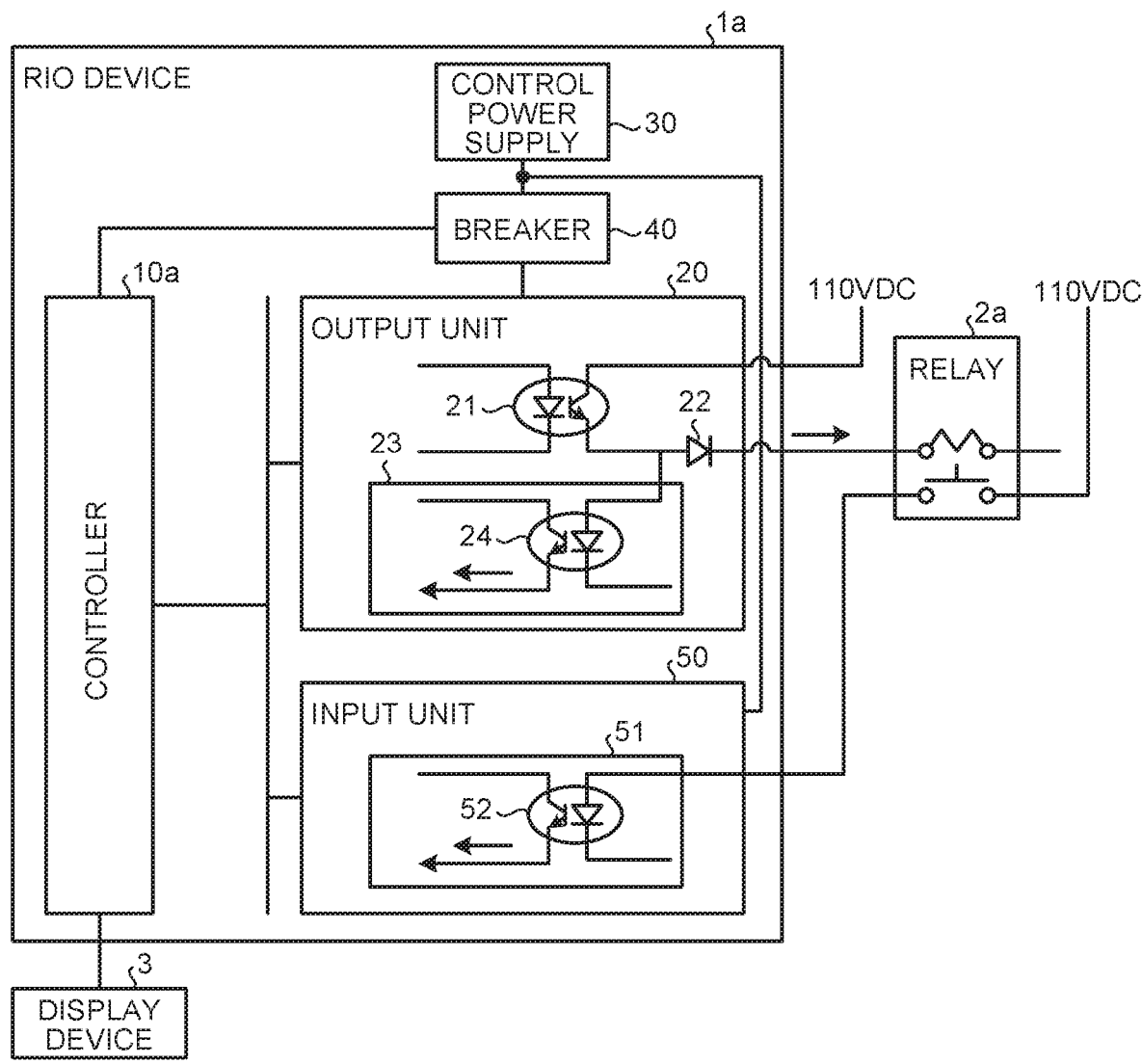
FIG. 6 is a block diagram illustrating a configuration example of a RIO device according to a second embodiment.

FIG. 6 is a block diagram illustrating a configuration example of a RIO device 1a according to the second embodiment. The RIO device 1a is connected to a relay 2a and the display device 3. Upon receiving input of a DO signal from the RIO device 1a, the relay 2a outputs a signal indicative of an operating state based on the inputted DO signal. The signal outputted from the relay 2a is inputted as a digital input (DI) signal to the RIO device 1a.

A description is provided of the configuration of the RIO device 1a. As compared with the RIO device 1 of the first embodiment illustrated in FIG. 1, the RIO device 1*a* includes a controller 10*a* in place of the controller 10 and additionally includes an input unit 50 that includes a feedback circuit 51. The feedback circuit 51 of the input unit 50 includes a photocoupler 52. The photocoupler 52 detects a signal outputted from the relay 2*a* as a DI signal. The feedback circuit 51 outputs, to the controller 10*a*, a detection result that indicates an input state of the DI signal, that is, whether or not the DI signal is inputted. In the second embodiment, the control power supply 30 supplies power to the input unit 50 in addition to the output unit 20.

In the second embodiment, the DO signal outputted from the output unit 20 of the RIO device 1*a* is used as a first signal, and the DI signal inputted to the input unit 50 of the RIO device 1*a* is used as a second signal. In addition, a detection result outputted from the readback circuit 23 to the controller 10*a* is used as a first detection result, and the detection result outputted from the feedback circuit 51 to the controller 10*a* is a second detection result. The controller 10*a* acquires the first detection results that are detected by the readback circuit 23 from the readback circuit 23 when making a signal stop request and a signal output request to the output unit 20. The controller 10*a* also acquires the second detection results that are detected by the feedback circuit 51 from the feedback circuit 51 when making the signal stop request and the signal output request to the output unit 20. Using the first detection results and second detection results each acquired, the controller 10*a* detects abnormality of the output unit 20.

Figure 7:
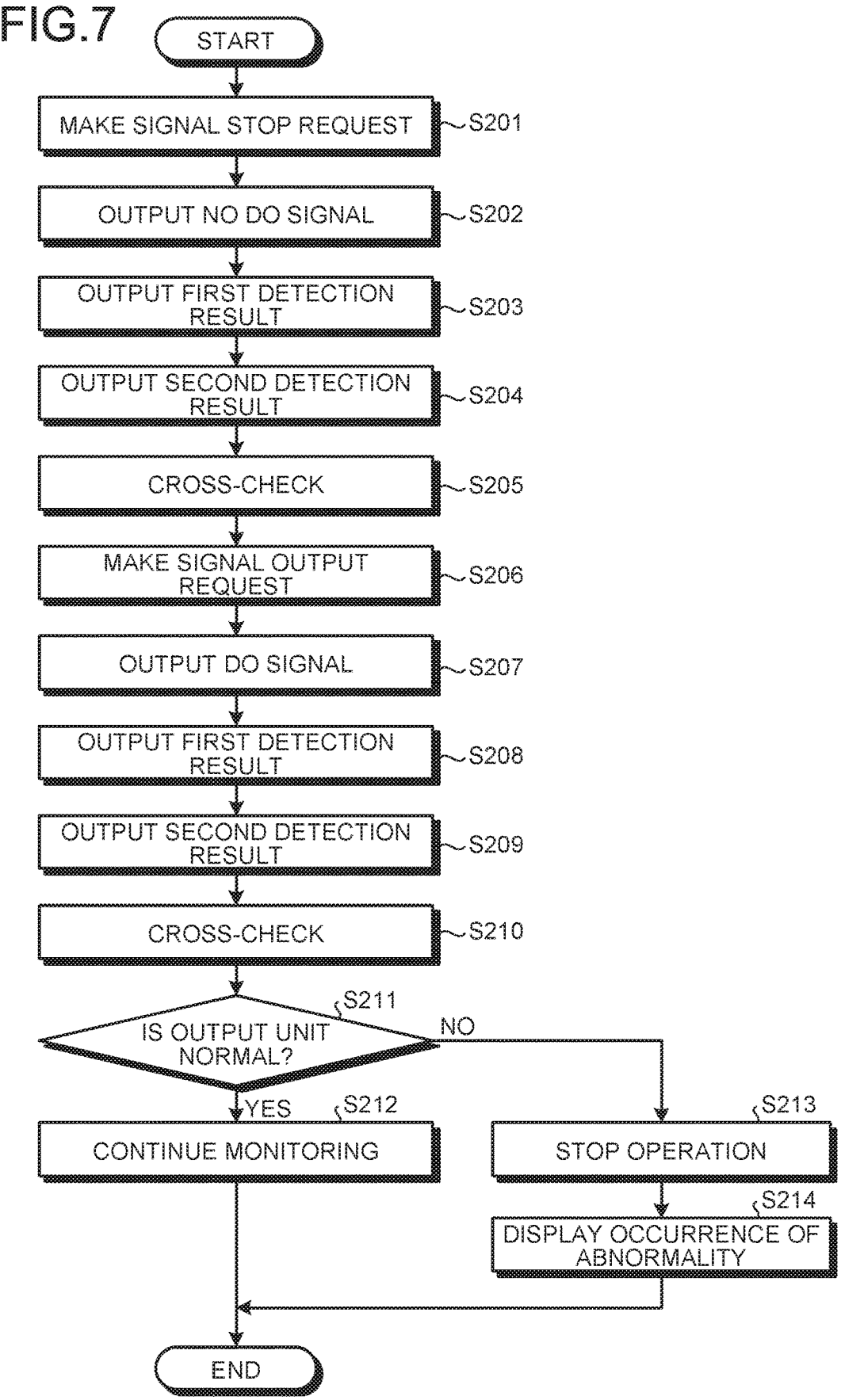
FIG. 7 is a flowchart illustrating an abnormality detection process of the RIO device according to the second embodiment.
Figure 8:
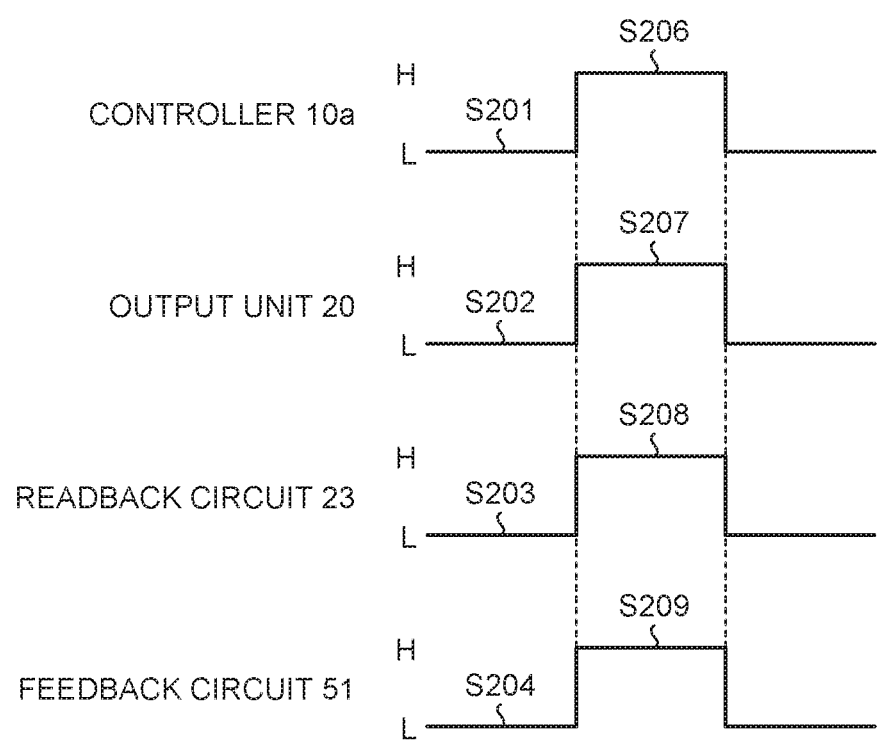
FIG. 8 illustrates signal output states of constituent elements of the RIO device according to the second embodiment.

A description is provided next of an abnormality detection process of the RIO device 1*a*. FIG. 7 is a flowchart illustrating the abnormality detection process of the RIO device 1*a* according to the second embodiment. FIG. 8 illustrates signal output states of the constituent elements of the RIO device 1*a* according to the second embodiment. Top three rows in FIG. 8 have different step characters but are substantially the same as those in FIG. 3. Illustrated in a bottom row of FIG. 8 is a detection result of the feedback circuit 51, that is, a signal outputted from the feedback circuit 51. As illustrated in the bottom row of FIG. 8, the detection result of the feedback circuit 51 takes on either one of values that represent two levels including a low (L) level and a high (H) level. The low (L) level indicates no signal being outputted from the relay 2*a*, that is, no DI signal being inputted. The high (H) level indicates a signal being outputted from the relay 2*a*, that is, a DI signal being inputted.

Processes of step S201 to step S203 are substantially the same as those of step S101 to step S103 of the first embodiment. A part for the controller 10 is interpreted as the controller 10*a*, and the detection result outputted from the readback circuit 23 to the controller 10*a* is interpreted as the first detection result. The same applies to the following description. The feedback circuit 51 of the input unit 50 outputs to the controller 10*a* the second detection result that indicates no second signal being outputted from the relay 2*a*, that is, no DI signal being inputted (step S204).

The controller 10*a* acquires from the readback circuit 23 the first detection result obtained during the signal stop request being made as an instruction and acquires from the feedback circuit 51 the second detection result obtained during the signal stop request being made as an instruction. The controller 10*a* cross-checks the first detection result acquired against the request made to the output unit 20 and cross-checks the second detection result acquired against the request made to the output unit 20 (step S205). In the example of FIG. 8, the controller 10*a* has acquired the first detection result (step S203) that indicates no DO signal being outputted from the output unit 20 in response to the signal stop request (step S201). Moreover, in the example of FIG. 8, the controller 10*a* has acquired the second detection result (S204) that indicates no DI signal being inputted to the input unit 50 in response to the signal stop request (step S201). On the basis of the above results of the cross-checks, the controller 10*a* determines that the output unit 20 is normal.

Processes of step S206 to step S208 are the substantially the same as those of step S105 to step S107 of the first embodiment. The feedback circuit 51 of the input unit 50 outputs to the controller 10*a* the second detection result that indicates the second signal being outputted from the relay 2*a*, that is, the DI signal being inputted (step S209).

The controller 10*a* acquires from the readback circuit 23 the first detection result obtained during the signal output request made as an instruction and acquires from the feedback circuit 51 the second detection result obtained during the signal output request made as an instruction. The controller 10*a* cross-checks the first detection result acquired against the request made to the output unit 20 and cross-checks the second detection result acquired against the request made to the output unit 20 (step S210). In the example of FIG. 8, the controller 10*a* has acquired the first detection result (step S208) that indicates the DO signal being outputted from the output unit 20 in response to the signal output request (step S206). Moreover, in the example of FIG. 8, the controller 10*a* has acquired the second detection result (S209) that indicates the DI signal being inputted to the input unit 50 in response to the signal output request (step S206). On the basis of the above results of the cross-checks, the controller 10*a* determines that the output unit 20 is normal.

If the controller 10*a* determines at both step S205 and step S210 that the output unit 20 is normal (step S211: Yes), the controller 10*a* continues monitoring an operating state of the output unit 20 through continual acquisition of the first detection result from the readback circuit 23 and continual acquisition of the second detection result from the feedback circuit 51 after start of operation of a train (step S212).

If the controller 10*a* determines at either or both of steps S205 and S210 that the output unit 20 is abnormal (step S211: No), the controller 10*a* controls the breaker 40 to stop the supply of power from the control power supply 30 to the output unit 20, so as to stop operation of the output unit 20 (step S213). Specific abnormal cases of the output unit 20 include a case where at least one of the first detection result of the readback circuit 23 and the second detection result of the feedback circuit 51 is high (H) when the signal of the controller 10*a* is low (L) at step S205. Also included as the abnormal case of the output unit 20 is a case where at least one of the first detection result of the readback circuit 23 and the second detection result of the feedback circuit 51 is low (L) when the signal of the controller 10*a* is high (H) at step S210. A process of step S214 is substantially the same as that of step S112 of the first embodiment.

A description is provided next of a hardware configuration of the RIO device 1*a*. The input unit 50 of the RIO device 1*a* is a digital signal input circuit. The rest of the configuration of the RIO device 1*a* is similar to the configuration of the RIO device 1 of the first embodiment.

As described above, according to the present embodiment, the RIO device 1*a* is further configured to use the second detection result of the feedback circuit 51 to make a determination of the operating state of the output unit 20. This enables the RIO device 1*a* to have improved accuracy in determining the abnormality of the output unit 20 as compared with the RIO device 1 of the first embodiment.

Third Embodiment

A RIO device according to the third embodiment is configured to include a plurality of output units. A description is provided of differences from the first embodiment.

Figure 9:
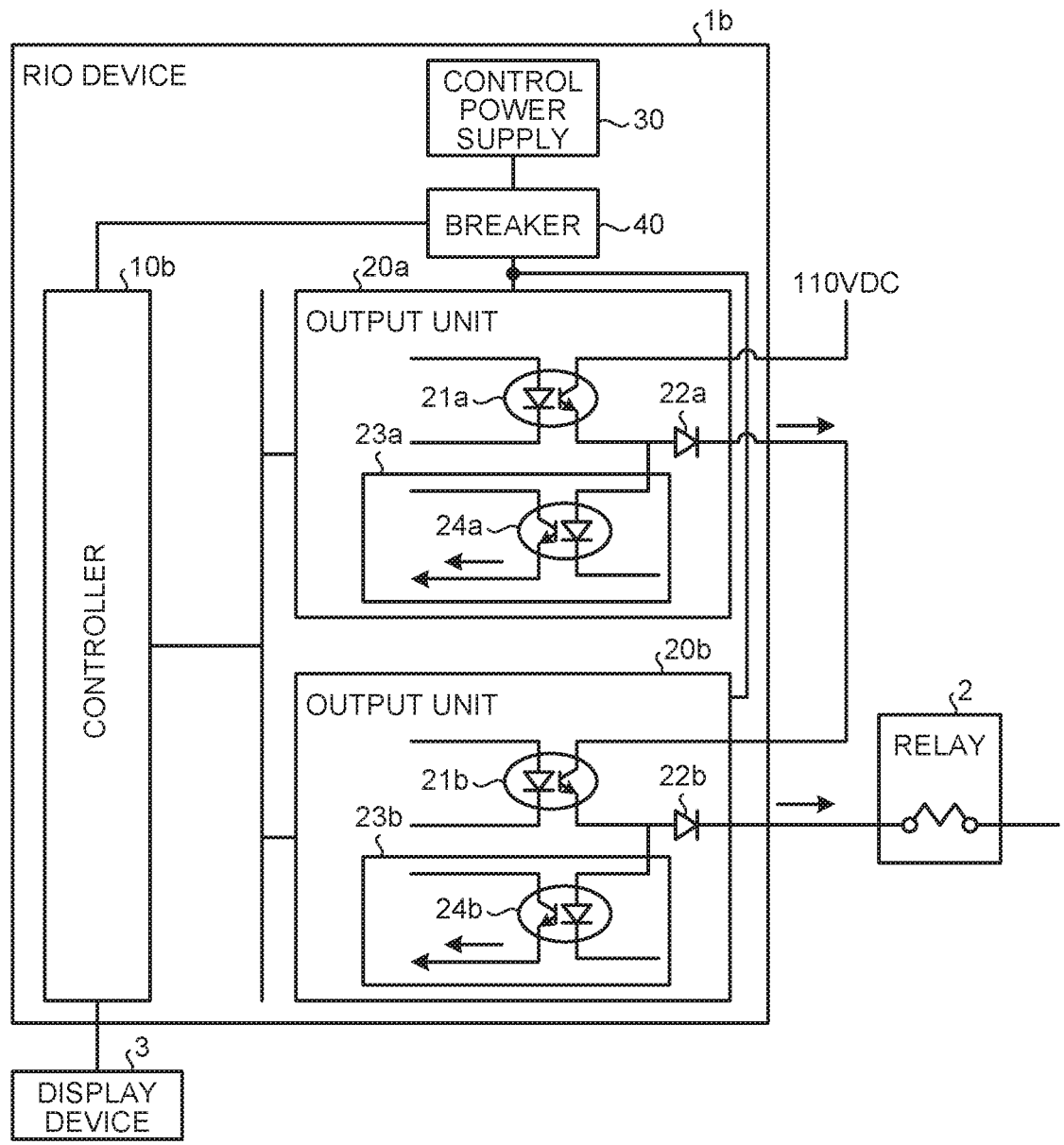
FIG. 9 is a block diagram illustrating a configuration example of a RIO device according to a third embodiment.

FIG. 9 is a block diagram illustrating a configuration example of the RIO device 1b according to the third embodiment. The RIO device 1b includes a controller 10b, the output units 20a and 20b, the control power supply 30, and the breaker 40. The output units 20a and 20b each have much the same configuration as that of the output unit 20 of the first embodiment illustrated in FIG. 1. This means that each of photocouplers 21a and 21b, each of diodes 22a and 22b, each of readback circuits 23a and 23b, and each of photocouplers 24a and 24b are similar in structure to the photocoupler 21, the diode 22, the readback circuit 23, and the photocoupler 24, respectively. The output units 20a and 20b of the RIO device 1b are connected in series to each other. As illustrated in FIG. 9, a DO signal outputted from the output unit 20a is inputted to the output unit 20b, and the DO signal outputted from the output unit 20b is inputted to the relay 2. The controller 10b controls whether or not to cause the output units 20a and 20b to output the DO signal. The controller 10b acquires detection results from the readback circuits 23a and 23b owned by the output units 20a and 20b and detects abnormality of each of the output units 20a and 20b using the acquired detection results. In FIG. 9, the number of output units is two, but this is an example and thus may be three or more. In the third embodiment, the control power supply 30 supplies power to the output units 20a and 20b.

Figure 10:
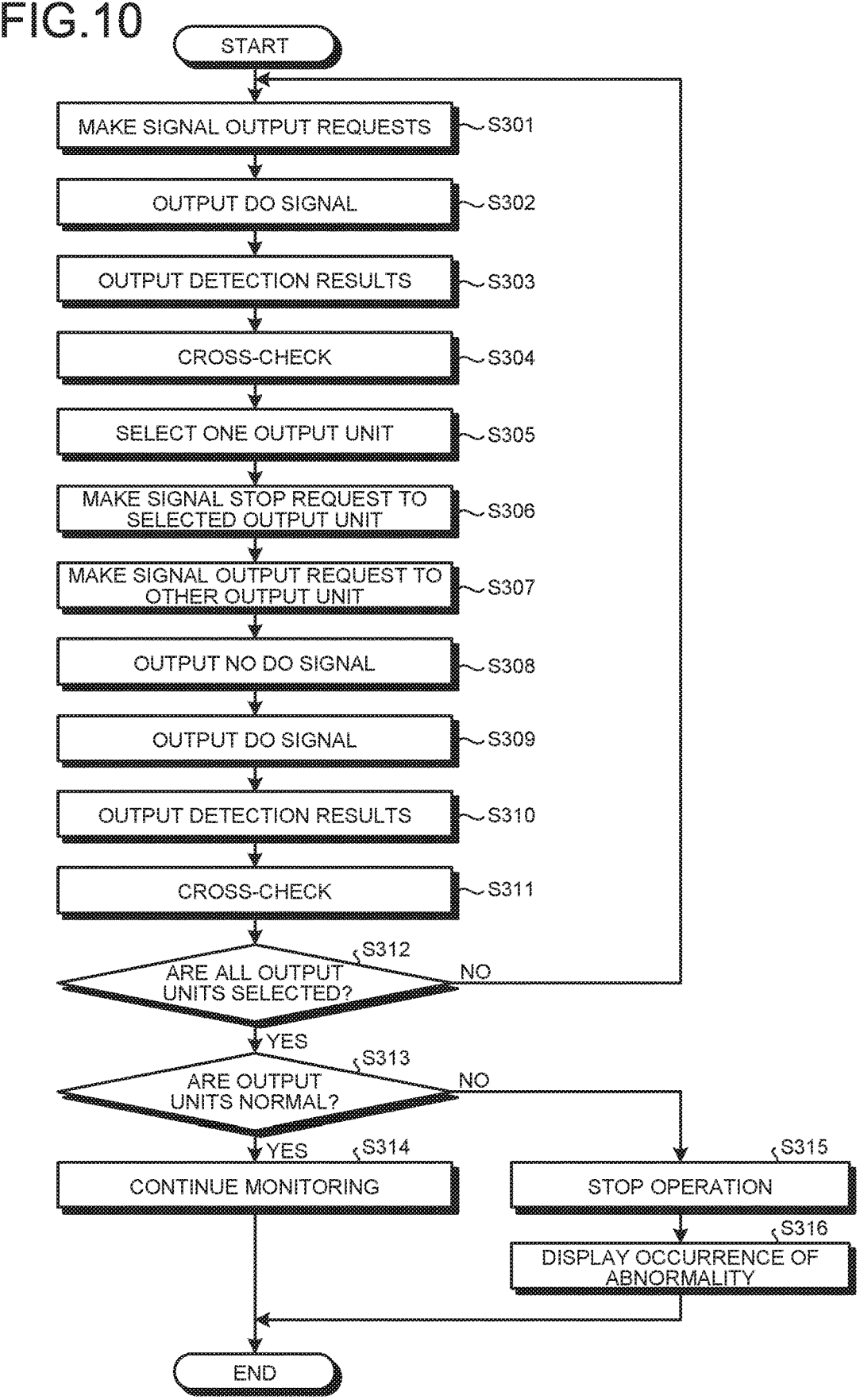
FIG. 10 is a flowchart illustrating an abnormality detection process of the RIO device according to the third embodiment.
Figure 11:
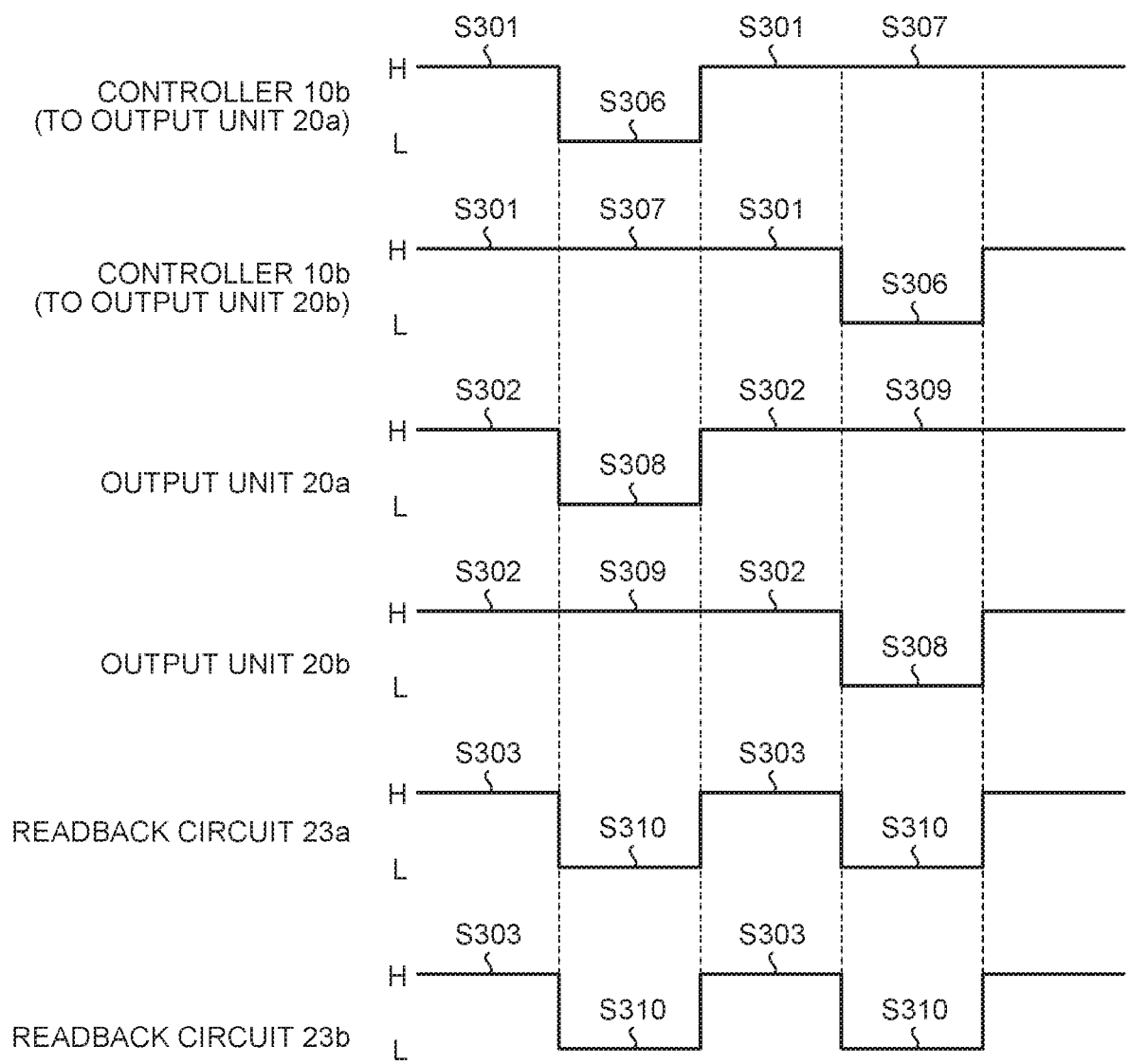
FIG. 11 illustrates signal output states of constituent elements of the RIO device according to the third embodiment.

A description is provided next of an abnormality detection process of the RIO device 1b. FIG. 10 is a flowchart illustrating the abnormality detection process of the RIO device 1b according to the third embodiment. FIG. 11 illustrates signal output states of the constituent elements of the RIO device 1b according to the third embodiment. Illustrated in a first row of FIG. 11 is a signal that is outputted from the controller 10b to the output unit 20a. Illustrated in a second row of FIG. 11 is a signal that is outputted from the controller 10b to the output unit 20b. A third row of FIG. 11 illustrates whether or not the DO signal is outputted from the output unit 20a, and a fourth row of FIG. 11 illustrates whether or not the DO signal is outputted from the output unit 20b. Illustrated in a fifth row of FIG. 11 is the detection result of the readback circuit 23a, that is, a signal outputted from the readback circuit 23a. Illustrated in a sixth row of FIG. 11 is the detection result of the readback circuit 23b, that is, a signal outputted from the readback circuit 23b. A low (L) signal level and a high (H) signal level in each signal have the same indications as those in FIG. 3.

When the RIO device 1b is activated, the controller 10b makes signal output requests to the output units 20a and 20b before operation of a train mounted with the RIO device 1b starts (step S301). During the signal output requests being made as instructions by the controller 10b, the output units 20a and 20b output the DO signals from the photocouplers 21a and 21b (step S302). Moreover, the readback circuits 23a and 23b of the output units 20a and 20b output to the controller 10b their detection results indicating the DO signals being outputted from the output units 20a and 20b (step S303).

The controller 10b obtains from the readback circuits 23a and 23b the detection results obtained during the signal output requests made as the instructions and cross-checks the acquired detection results against the requests made to the output units 20a and 20b (step S304). In the example of FIG. 11, since the controller 10b has acquired the detection results (step S303) indicating the DO signals outputted from the output units 20a and 20b in response to the signal output requests (step S301), the controller 10b determines that the output units 20a and 20b are normal.

The controller 10b selects one of two or more output units, namely, the output units 20a and 20b (step S305). In this example, the controller 10b selects the output unit 20a. The controller 10b makes a signal stop request to the selected output unit 20a (step S306) and makes the signal output request to the other unselected output unit 20b (step S307). During the signal stop request made as an instruction by the controller 10b, the selected output unit 20a does not output the DO signal from the photocoupler 21a (step S308). During the signal output request made as an instruction by the controller 10b, the other unselected output unit 20b outputs the DO signal from the photocoupler 21b (step S309). Moreover, the readback circuit 23a of the selected output unit 20a outputs to the controller 10b the detection result indicative of no DO signal being outputted from the output unit 20a. The readback circuit 23b of the other unselected output unit 20b outputs to the controller 10b the same detection result as the readback circuit 23a (step S310).

The controller 10b acquires from the readback circuit 23a the detection result obtained during the signal stop request made to the output unit 20a as an instruction and acquires from the readback circuit 23b the detection result obtained during the signal output request made to the output unit 20b as an instruction. The controller 10b cross-checks the acquired detection results against the requests made to the output units 20a and 20b (step S311). In the example of FIG. 11, since the controller 10b has acquired the detection results (step S310) indicating no DO signal being outputted from the readback circuits 23a and 23b in response to the signal stop request made to the output unit 20a (step S306), the controller 10b determines that the RIO device 1b is normal.

Since the controller 10b has not selected all the output units at step S305 (step S312: No), the controller 10b returns to a process of step S301. The RIO device 1b executes the above-stated process from step S301 to step S304.

The controller 10b selects one of two or more output units, namely, the output units 20a and 20b (step S305). In this example, the controller 10b selects the output unit 20b. The controller 10b makes the signal stop request to the selected output unit 20b (step S306) and makes the signal output request to the other unselected output unit 20a (step S307). During the signal stop request made as an instruction by the controller 10b, the selected output unit 20b does not output the DO signal from the photocoupler 21b (step S308). During the signal output request made as an instruction by the controller 10b, the other unselected output unit 20a outputs the DO signal from the photocoupler 21a (step S309). Moreover, the readback circuit 23b of the selected output unit 20b outputs to the controller 10b the detection result indicative of no DO signal being outputted from the output unit 20b. The readback circuit 23a of the other unselected output unit 20a outputs to the controller 10b the same detection result as the readback circuit 23b (step S310).

The controller 10b acquires from the readback circuit 23b the detection result obtained during the signal stop request made to the output unit 20b as an instruction and acquires from the readback circuit 23a the detection result obtained during the signal output request made to the output unit 20*a* as an instruction. The controller 10*b* cross-checks the acquired detection results against the requests made to the output units 20*a* and 20*b* (step S311). In the example of FIG. 11, since the controller 10*b* has acquired the detection results (step S310) indicating no DO signal being outputted from the readback circuits 23*a* and 23*b* in response to the signal stop request made to the output unit 20*b* (step S306), the controller 10*b* determines that the RIO device 1*b* is normal.

Since the controller 10*b* has selected all the output units at step S305 (step S312: Yes), the controller 10*b* proceeds to a process of step S313. If the controller 10*b* determines at all of steps S304 and S311 that the output units 20*a* and 20*b* are normal (step S313: Yes), the controller 10*b* continues monitoring operating states of the output units 20*a* and 20*b* through continual acquisition of the detection results from the readback circuits 23*a* and 23*b* after the start of the operation of the train (step S314).

If the controller 10*b* determines at at least one of step S304 and step S311 that the output unit 20*a* or 20*b* is abnormal (step S313: No), the controller 10*b* controls the breaker 40 to stop the supply of power from the control power supply 30 to the output units 20*a* and 20*b*, so as to stop operation of the output units 20*a* and 20*b* (step S315). The controller 10*b* causes the display device 3 to display that at least one of the output unit 20*a* and the output unit 20*b* has its abnormality, or that the RIO device 1*b* has the abnormality (step S316).

In the present embodiment, the two or more output units 20*a* and 20*b* of the RIO device 1*b* are configured as an AND circuit. In other words, when the controller 10*b* makes the signal output request to all the output units 20*a* and 20*b*, the RIO device 1*b* outputs the DO signal to the relay 2. On the other hand, when the controller 10*b* makes the signal stop request to at least one of the output units 20*a* and 20*b*, the RIO device 1*b* does not output the DO signal to the relay 2.

According to the present embodiment described above, one of two or more output units is sequentially selected one by one, so as to make the signal stop request to each output unit. Then, based on the signal output states of the output units and the readback circuits during this request, the operating states of the output units are determined. By so doing, when any of the output units has the abnormality, the RIO device 1*b* can detect the abnormality of that output unit.

Fourth Embodiment

A RIO device according to the fourth embodiment is configured to include a plurality of output units and an input unit. A description is provided for differences from the first to third embodiments.

Figure 12:
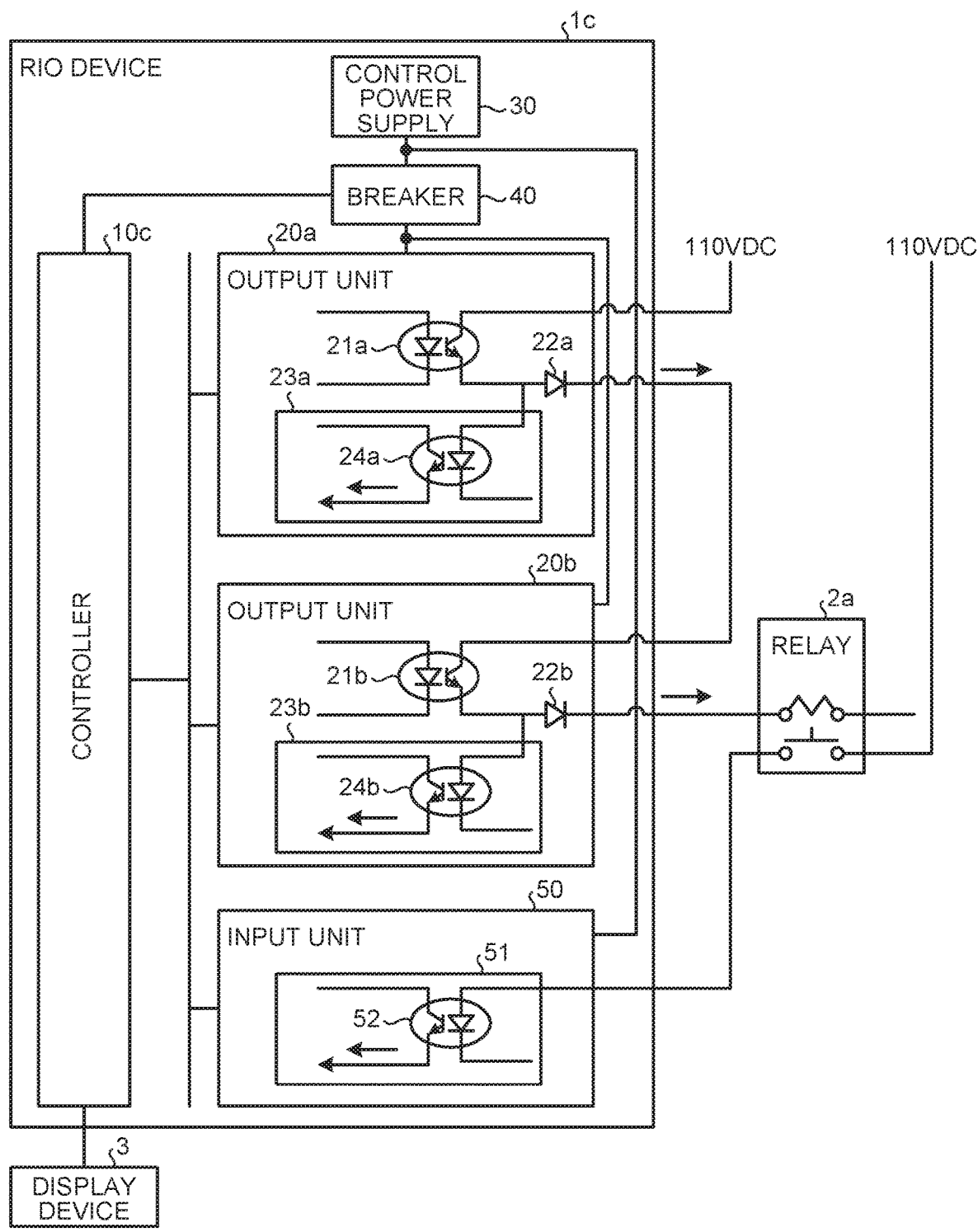
FIG. 12 is a block diagram illustrating a configuration example of a RIO device according to a fourth embodiment.

FIG. 12 is a block diagram illustrating a configuration example of the RIO device 1*c* according to the fourth embodiment. The RIO device 1*c* is connected to the relay 2*a* and the display device 3. A description is provided for the configuration of the RIO device 1*c*. As compared with the RIO device 1*b* of the third embodiment shown in FIG. 9, the RIO device 1*c* has a controller 10*c* in place of the controller 10*b* and additionally has an input unit 50 that includes feedback circuit 51. In the fourth embodiment, the control power supply 30 supplies power to the input unit 50 in addition to the output units 20*a* and 20*b*.

In the fourth embodiment, a DO signal outputted from the output units 20*a* and 20*b* of the RIO device 1*c* is referred to as a first signal, and a DI signal inputted to the input unit 50 of the RIO device 1*c* is referred to as a second signal. In addition, detection results outputted from the readback circuits 23*a* and 23*b* to the controller 10*c* are referred to as first detection results, and a detection result outputted from the feedback circuit 51 to the controller 10*c* is referred to as a second detection result. The controller 10*c* acquires the first detection results detected by the readback circuits 23*a* and 23*b* from the readback circuits 23*a* and 23*b* when making a signal stop request and a signal output request to the output units 20*a* and 20*b*. The controller 10*c* also acquires the second detection result detected by the feedback circuit 51 from the feedback circuit 51 when making the signal stop request and the signal output request to the output units 20*a* and 20*b*. Using the acquired first detection results and the acquired second detection result, the controller 10*c* detects abnormality of the output unit 20*a* or 20*b*.

Figure 13:
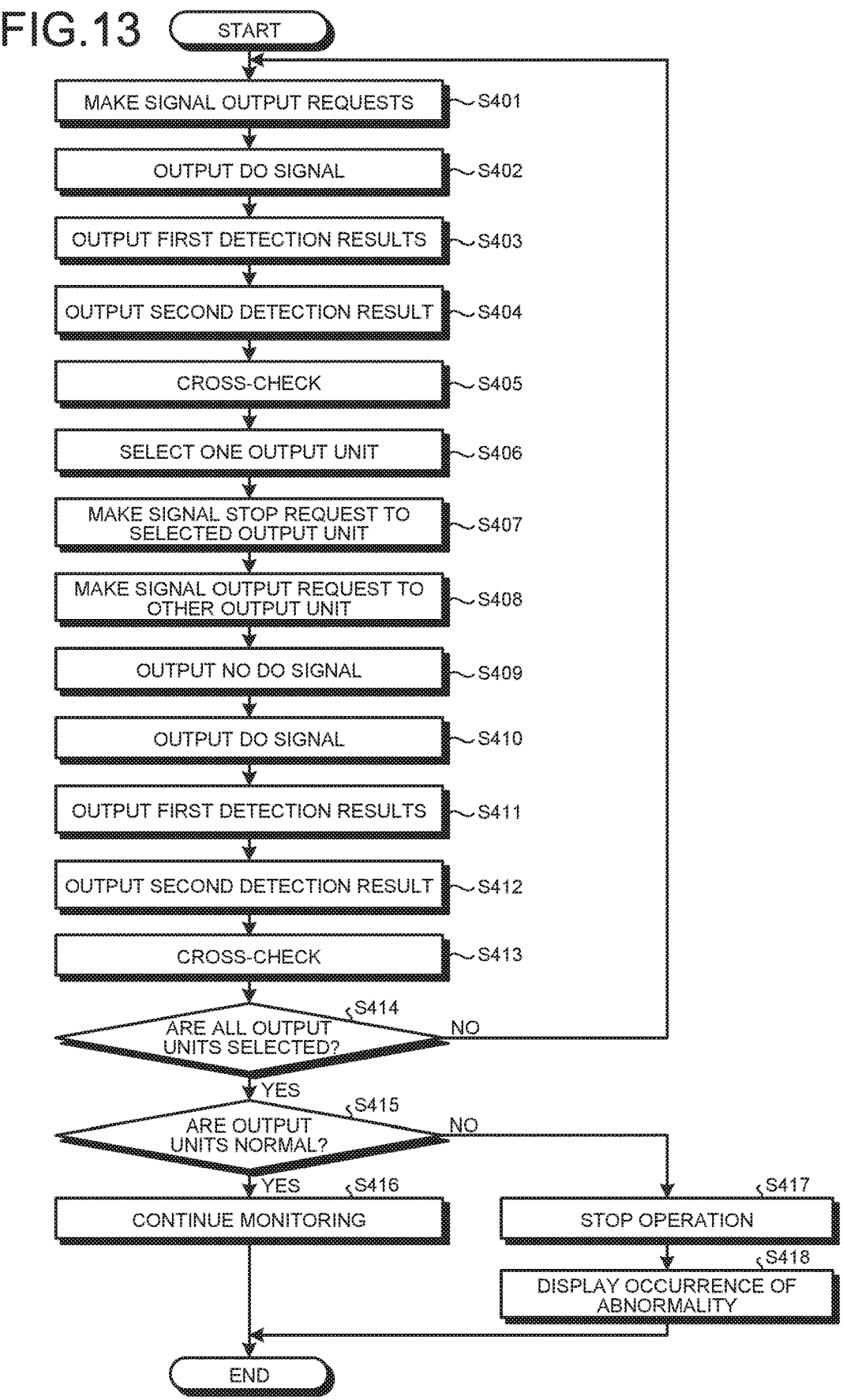
FIG. 13 is a flowchart illustrating an abnormality detection process of the RIO device according to the fourth embodiment.
Figure 14:
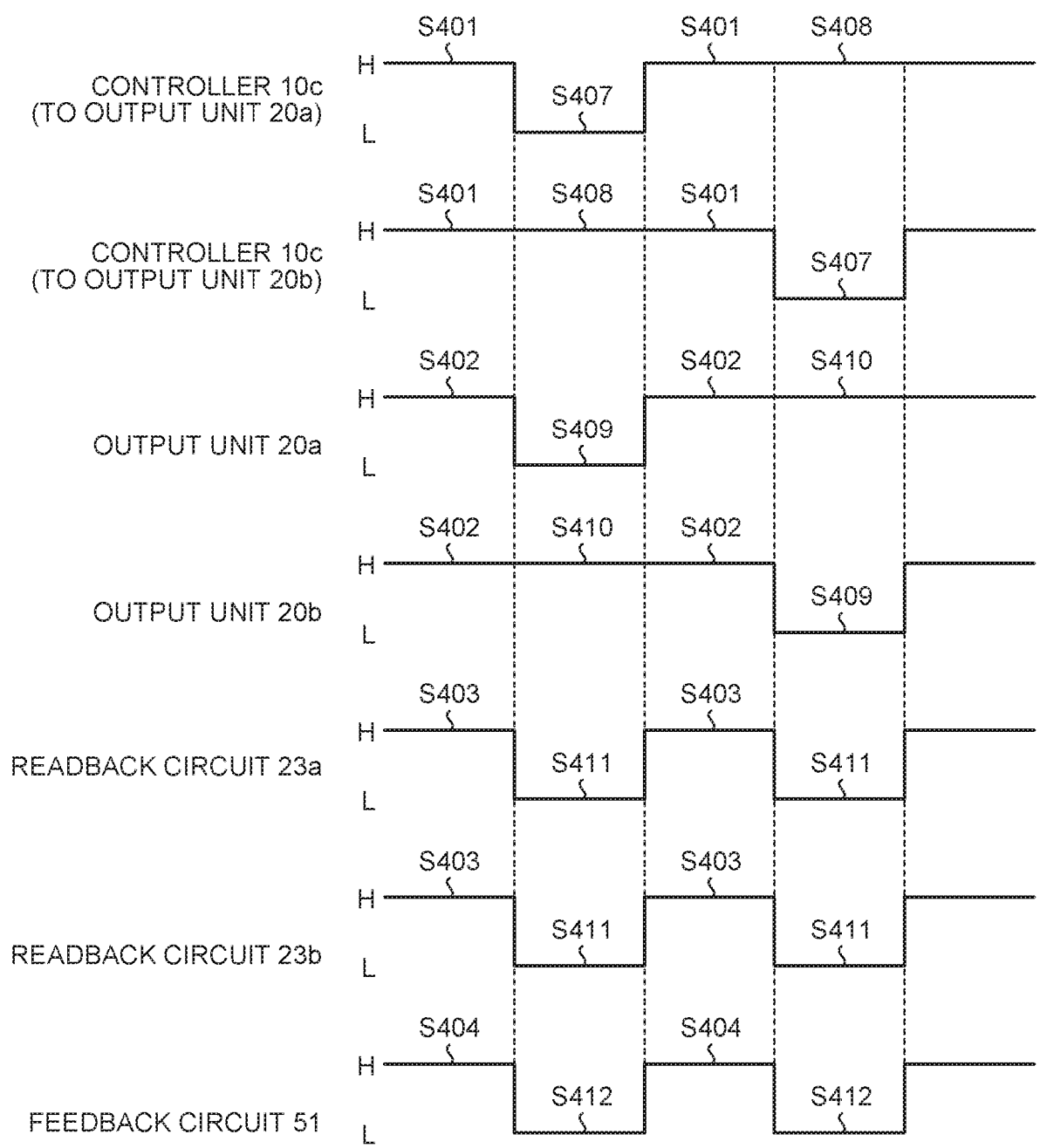
FIG. 14 illustrates signal output states of constituent elements of the RIO device according to the fourth embodiment.

A description is provided next of an abnormality detection process of the RIO device 1*c*. FIG. 13 is a flowchart illustrating the abnormality detection process of the RIO device 1*c* according to the fourth embodiment. FIG. 14 illustrates signal output states of the constituent elements of the RIO device 1*c* according to the fourth embodiment. Top six rows in FIG. 14 have different step characters but are the same as those in FIG. 11.

Illustrated in a bottom row of FIG. 14 is a detection result of the feedback circuit 51, that is, a signal outputted from the feedback circuit 51. A low (L) signal level and a high (H) signal level for each signal have the same indications as those in FIG. 8.

Processes of step S401 to step S403 are substantially the same as those of step S301 to step S303 of the third embodiment. A part for the controller 10*b* is interpreted as the controller 10*c*, and detection results outputted to the controller 10*c* from the readback circuits 23*a* and 23*b* are regarded as first detection results. The same applies to the following description. The feedback circuit 51 of the input unit 50 outputs to the controller 10*c* the second detection result that indicates the second signal being outputted from the relay 2*a*, that is, the DI signal being inputted (step S404).

The controller 10*c* acquires from the readback circuits 23*a* and 23*b* the first detection results obtained during the signal output requests made as instructions and acquires from the feedback circuit 51 the second detection result obtained during the signal output request made as an instruction. The controller 10*c* cross-checks the required first detection results against the requests made to the output units 20*a* and 20*b* and cross-checks the acquired second detection result against the requests made to the output units 20*a* and 20*b* (step S405). In the example of FIG. 14, the controller 10*c* has acquired the first detection results (step S403) that indicate the DO signals being outputted from the output units 20*a* and 20*b* in response to the signal output requests (step S401). Moreover, in the example of FIG. 14, the controller 10*c* has acquired the second detection result (step S404) that indicates the DI signal being inputted to the input unit 50 in response to the signal output requests (step S401). On the basis of the above results of the cross-checks, the controller 10*c* determines that the RIO device 1*c* is normal.

Processes of step S406 to step S411 are substantially the same as those of step S305 to step S310 in a first round of the third embodiment. The feedback circuit 51 of the input unit 50 outputs to the controller 10*c* the second detection result that indicates no second signal being outputted from the relay 2*a*, that is, no DI signal being inputted (step S412).

The controller 10*c* acquires from the readback circuit 23*a* the detection result obtained during the signal stop request made to the output unit 20*a* as an instruction and acquires from the readback circuit 23*b* the detection result obtained during the signal output request made to the output unit 20b as an instruction. The controller 10c acquires from the feedback circuit 51 the second detection result obtained while the signal stop request and the signal output request are made as instructions to the output units 20a and 20b, respectively. The controller 10c cross-checks the acquired first detection results against the requests made to the output units 20a and 20b and cross-checks the acquired second detection result against the requests made to the output units 20a and 20b (step S413). In the example of FIG. 14, the controller 10c has acquired the first detection results (step S411) that indicate no DO signal being outputted from the output units 20a and 20b in response to the signal stop request (step S407). Moreover, in the example of FIG. 14, the controller 10c has acquired the second detection result (step S412) that indicates no DI signal being inputted to the input unit 50 in response to the signal stop request (step S407) made to the output unit 20a. On the basis of the above results of the cross-checks, the controller 10c determines that the output units 20a and 20b are normal.

Since the controller 10c does not select all the output units at step S406 (step S414: No), the controller 10c returns to a process of step S401. The RIO device 1c executes the above-stated process from step S401 to step S405. The RIO device 1c executes a process similar to a process of steps S305 to S310 in a second round of the third embodiment in the subsequent steps S406 to S411. The feedback circuit 51 of the input unit 50 outputs to the controller 10c the second detection result that indicates no second signal being outputted from the relay 2a, that is, no DI signal being inputted (step S412).

The controller 10c obtains from the readback circuit 23b the detection result obtained during the signal stop request made to the output unit 20b as an instruction and obtains from the readback circuit 23a the detection result obtained during the signal output request made to the output unit 20a as an instruction. The controller 10c obtains from the feedback circuit 51 the second detection result obtained while the signal stop request and the signal output request are made as instructions to the output units 20b and 20a, respectively. The controller 10c cross-checks the obtained first detection results against the requests made to the output units 20a and 20b and cross-checks the obtained second detection result against the requests made to the output units 20a and 20b (step S413). In the example of FIG. 14, the controller 10c has acquired the first detection results (step S411) that indicate no DO signal being outputted from the output units 20a and 20b in response to the signal stop request (step S407) made to the output unit 20b. Moreover, in the example of FIG. 14, the controller 10c has acquired the second detection result (step S412) that indicates no DI signal being inputted to the input unit 50 in response to the signal stop request (step S407) made to the output unit 20b. On the basis of the above results of the cross-checks, the controller 10c determines that the RIO device 1c is normal.

Since the controller 10c has selected all the output units at step S406 (step S414: Yes), the controller 10c proceeds to a process of step S415. If the controller 10c determines at all of steps S405 and S413 that the output units 20a and 20b are normal (step S415: Yes), the controller 10c continues monitoring operating states of the output units 20a and 20b through continual acquisition of the first detection results from the readback circuits 23a and 23b and continual acquisition of the second detection result from the feedback circuit 51 after start of operation of a train (step S416).

If the controller 10c determines at at least one of step S405 and step S413 that the output unit 20a or 20b is abnormal (step S415: No), the controller 10c controls the breaker 40 to stop the supply of power from the control power supply 30 to the output units 20a and 20b, so as to stop operation of the output units 20a and 20b (step S417). The controller 10c causes the display device 3 to display that at least one of the output unit 20a and the output unit 20b has a failure, or abnormality has occurred in the RIO device 1c (step S418).

According to the present embodiment described above, the RIO device 2 is configured to further use the second detection result of the feedback circuit 51 to determine how the operating states of the output units 20a and 20b are. This enables the RIO device 1c to have improved accuracy in determining the abnormalities of the output units 20a and 20b as compared with the RIO device 1b of the third embodiment.

The above configurations illustrated in the embodiments are examples of contents of the present invention, and can be combined with other publicly known techniques and each partially omitted and/or modified without departing from the gist of the present invention.

REFERENCE SIGNS LIST 1, 1a, 1b, 1c RIO device; 2, 2a relay; 3 display device; 10, 10a, 10b, 10c controller; 20, 20a, 20b output unit; 21, 21a, 21b, 24, 24a, 24b, 52 photocoupler; 22, 22a, 22b diode; 23, 23a, 23b readback circuit; 30 control power supply; 40 breaker; 50 input unit; 51 feedback circuit.

The invention claimed is:
1. A signal control device mounted to a train, the signal control device comprising:
   an output unit to output a signal to an external device mounted to the train; and
   a controller to control whether or not to cause the output unit to output the signal, wherein
   the output unit includes a readback circuit to detect whether or not the signal is outputted from the output unit, and
   the controller makes a signal stop request and a signal output request to the output unit before operation of the train starts, acquires a detection result of the readback circuit while each of the signal stop request and the signal output request is performed, and detects abnormality of the output unit using the detection result.
2. The signal control device according to claim 1, wherein
   the signal outputted from the output unit is used as a first signal, while the detection result of the readback circuit is used as a first detection result,
   the signal control device further comprises a feedback circuit to detect a second signal indicative of an operating state of the external device to which the first signal is inputted, and
   the controller acquires a second detection result of the feedback circuit while each of the signal stop request and the signal output request is performed and detects abnormality of the output unit using the first detection result and the second detection result.
3. The signal control device according to claim 2, wherein
   the controller stops supply of power to the output unit when abnormality of the output unit is detected.
4. The signal control device according to claim 1 or 2, wherein
   the controller stops supply of power to the output unit when abnormality of the output unit is detected.

5. The signal control device according to claim 4, wherein the controller causes a display device to display that abnormality of the output unit is detected.

6. The signal control device according to claim 1, comprising two or more output units each equal in configuration to the output unit, wherein
the controller makes the signal stop request and the signal output request to the output units before operation of the train starts, acquires detection results of two or more readback circuits while each of the signal stop request and the signal output request is performed, and detects abnormality of any of the output units using two or more detection results.

7. The signal control device according to claim 6, wherein
the signal outputted from each of the output units is used as a first signal, while the detection results of the readback circuits are used as first detection results,
the signal control device further comprises a feedback circuit to detect a second signal indicative of an operating state of the external device to which the first signal is inputted, and
the controller acquires a second detection result of the feedback circuit while each of the signal stop request and the signal output request is performed, and detects abnormality of any of the output units using two or more first detection results and the second detection result.

8. The signal control device according to claim 7, wherein the controller stops supply of power to the output units when abnormality is detected in any of the output units.

9. The signal control device according to claim 6, wherein the controller stops supply of power to the output units when abnormality is detected in any of the output units.

10. The signal control device according to claim 9, wherein
the controller causes a display device to display that abnormality is detected in any of the output units.

11. An abnormality detection method in a signal control device mounted to a train, the abnormality detection method comprising:
a first step of a controller making a signal stop request and a signal output request to an output unit before operation of the train starts;
a second step of the output unit outputting or stopping a signal to an external device mounted to the train in accordance with a request of the controller;
a third step of a readback circuit owned by the output unit detecting whether or not the signal is outputted from the output unit; and
a fourth step of the controller acquiring a detection result of the readback circuit while each of the signal stop request and the signal output request is performed and detecting abnormality of the output unit using the detection result.

12. The abnormality detection method according to claim 11, wherein the signal outputted from the output unit is used as a first signal, while the detection result of the readback circuit is used as a first detection result,
the abnormality detection method further comprises a fifth step of a feedback circuit detecting a second signal indicative of an operating state of the external device to which the first signal is inputted, and
in the fourth step, the controller acquires a second detection result of the feedback circuit while each of the signal stop request and the signal output request is performed, and detects abnormality of the output unit by using the first detection result and the second detection result.

13. The abnormality detection method according to claim 12, further comprising a sixth step of the controller stopping supply of power to the output unit when abnormality of the output unit is detected.

14. The abnormality detection method according to claim 11, further comprising a sixth step of the controller stopping supply of power to the output unit when abnormality of the output unit is detected.

15. The abnormality detection method according to claim 14, further comprising a seventh step of the controller causing a display device to display that abnormality of the output unit is detected.

16. The abnormality detection method according to claim 11, wherein
the signal control device includes two or more output units each equal in configuration to the output unit,
in the first step, the controller makes the signal stop request and the signal output request to the output units before operation of the train starts,
in the second step, the output units each output or stop the signal in accordance with a request of the controller,
in the third step, each of readback circuits owned by the output units detects whether or not the signal is outputted from the output unit, and
in the fourth step, the controller acquires detection results of the readback circuits while each of the signal stop request and the signal output request is performed, and detects abnormality of any of the output units using two or more detection results.

17. The abnormality detection method according to claim 16, wherein
the signal outputted from each of the output units is used as a first signal, while the detection results of the readback circuits are used as first detection results,
the abnormality detection method further comprises a fifth step of a feedback circuit detecting a second signal indicative of an operating state of the external device to which the first signal is inputted, and
in the fourth step, the controller acquires a second detection result of the feedback circuit while each of the signal stop request and the signal output request is performed, and detects abnormality of any of the output units using two or more first detection results and the second detection result.

18. The abnormality detection method according to claim 17, further comprising a sixth step of the controller stopping supply of power to the output units when abnormality is detected in any of the output units.

19. The abnormality detection method according to claim 16, further comprising a sixth step of the controller stopping supply of power to the output units when abnormality is detected in any of the output units.

20. The abnormality detection method according to claim 19, further comprising a seventh step of the controller causing a display device to display that abnormality is detected in any of the output units.

* * * * *